United States Patent [19]

Ng

[11] Patent Number: 5,341,351
[45] Date of Patent: Aug. 23, 1994

[54] METHOD AND MEANS FOR OPTIMALLY ACCESSING DATA RESIDING ON DUAL ACTUATOR DASDS

[75] Inventor: Spencer W. Ng, San Jose, Calif.

[73] Assignee: International Business Machines Corporation, Armonk, N.Y.

[21] Appl. No.: 958,860

[22] Filed: Oct. 8, 1992

[51] Int. Cl.$^5$ ............................................. G11B 17/22
[52] U.S. Cl. .................................... 369/30; 360/77.02
[58] Field of Search ............... 369/30, 32, 44.37, 44.38, 369/94, 102, 111, 112, 121; 360/69, 75, 74.01, 74.02, 98.07, 137; 395/425, 275

[56] References Cited

U.S. PATENT DOCUMENTS

| | | | |
|---|---|---|---|
| 4,430,701 | 2/1984 | Christian et al. | 364/200 |
| 4,743,995 | 5/1988 | Castle et al. | 360/98 |
| 5,177,652 | 1/1993 | Yamaguchi et al. | 360/77.02 |
| 5,189,578 | 2/1993 | Mori et al. | 360/77.02 |

FOREIGN PATENT DOCUMENTS 58-1861  1/1983  Japan .................................. 360/77.02

OTHER PUBLICATIONS

IBM Technical Disclosure Bulletin, vol. 33, No. 8, Jan. 1991, pp. 270–272.
UNIX Review, Oct. 1989, Section: vol. 7; No. 10; p. 153 announced Century Data Inc's. t2802 multichannel, parallel transfer data storage subsystem for use in graphics data-storage.

*Primary Examiner*—Robert J. Pascal
*Assistant Examiner*—Tan Dinh
*Attorney, Agent, or Firm*—R. Bruce Brodie

[57] ABSTRACT

A method and means for ensuring maximal occupancy of dual actuators movable over a cyclic multitracked DASD in transferring any percentage mix of short and long records over a set of queued referencing commands by the selective serial or concurrent dispatching of actuators to the same or different records solely as a function of the ascertained actuator availability, reference queue length, and the length of the referenced record.

10 Claims, 5 Drawing Sheets

DUAL ACTUATOR DASD

DUAL ACTUATOR DASD

ACCESS METHOD FLOWCHART

MODE RESPONSE TIME COMPARISONS FOR EXAMPLE 1

METHOD AND MEANS FOR OPTIMALLY ACCESSING DATA RESIDING ON DUAL ACTUATOR DASDS

FIELD OF THE INVENTION

This invention relates to a method and means for accessing data residing on direct access storage devices having multiple independently operable actuators with attached head/arm assemblies.

DESCRIPTION OF RELATED ART

Direct Access Storage

A direct access storage device (DASD) is a device in which access time is effectively independent of the location of the data as found for example on cyclic multitracked storage media. Such a DASD typically includes a plurality of disks concentrically mounted on a rotatable, constant angular speed, motor driven spindle. The disks are spaced apart along the spindle sufficient to permit one or more actuators to move radially over at least one surface on each disk.

In moving magnetic storage, transducers termed read/write heads either imprint a focused pattern of magnetic spots along a track or detect the same. Data in the form of patterns of magnetic spots are recorded along one or more tracks following a predetermined format. Each track is divided into "cells" circumferentially. A predetermined number of cells forms a "sector". Positions along any track in relation to a transducer in immediate proximity are expressed by way of a rotational sensing past a reference point or marker (yielding sector and/or cell location). Consequently, each data element is physically located as a function of a DASD, disk, track, and sector identification.

Electronic Versus Electromechnical Access of DASD

In the prior art, it was known for example from the IBM 2305 fixed Head Storage Module as described in Christian, et. al. U.S. Pat. No. 4,430,701, issued Feb. 7, 1984 that if one head was in a fixed position with each track then access to the contents of any one track could be switched at electronic speeds. However, as track density substantially increased in the radial direction, the cost and complexity of such electronic accessing became prohibitive.

In this specification, an "actuator" connotes an electromechanical assemblage including an arm tipped at one of its ends with a read/write head or transducer, positioning means at the other end of the arm and responsive to electrical signals for radially moving over a disk surface, and a signal path connection between the transducer and DASD control electronics. The combination of radial positioning and constant speed rotation of the disk renders any data on any of the concentric tracks accessible at a fraction of the cost of a fixed head system. However, the seek times of such a movable arm or actuator access are in the order of milliseconds (e.g. $25*10^{-3}$) rather than microseconds (e.g. $5*10^{-6}$). The actual convergence of an actuator and transducer on any selected track utilizes feedback involving minimizing the error between the actual position of the transducer and the target track position as expressed on a reference or servo disk with concentric tracks and markings.

Use of Multiple Actuators

It is also known from the prior art, Castle et al, U.S. Pat. No. 4,743,995, "Disk File with In-Hub Motor" issued May 10, 1988, to dispose multiple independently operable actuators about DASD disks.

Floryance, IBM Technical Disclosure Bulletin, vol. 33, pp. 270–272, January 1991 teaches that a pair of mirrored dual actuator DASDs sharing common data can be operated as a dual ported write buffer. Selective dispatching of a pair of actuators or arms is made as a function of workload analysis for latency reduction and parallel data transfer. Indeed, Floryance uses one of the actuator arms for writing externally supplied data concurrently with the other arm either free to service read commands or transferring the updates to a DASD array.

UNIX Review, October, 1989 SECTION: Vol. 7; No. 10; page 153 announced Century Data Inc.'s t2802 multichannel, parallel-transfer data-storage subsystem for use in graphics data-storage. Their system included two 8-inch head-disk assemblies, each incorporating dual actuators and four read/write heads per disk surface. The device simultaneously records and plays back the graphic data needed to store and update frames of information in real time similar to the parallel transfer mode.

Dual Actuator and Operating Modes

It is recognized in the art that DASDs with dual actuators could be operated in only ONE of three modes, namely independent, latency, or parallel transfer modes. It is also known that external storage subsystems formed from dual actuator DASDs can be tuned. However, the tuning in terms of response time as a function of reference inter arrival times and servicing is sub optimal. That is, all three modes tend to slow down rapidly as the reference rate increases, especially the latency and parallel transfer modes. Further, the slow down rate shifts as a function of whether the mix of records to be transferred are predominantly short or long. For purposes of this invention these modes are defined as follows:

Independent mode: the two actuator arms are operated independently such that each arm could service an different I/O request.

Latency mode: dispatching or utilizing that arm which is closest to the referenced record such that the latency or rotational delay is reduced, latency being the time or rotational delay until the data of interest is under the desired arm and transducer head.

Parallel mode: synchronizing the arms to access the same referenced record whose length exceeds T such that one arm accesses the first half and the second arm accesses the remaining half of the record. This is effective primarily for long records.

Illustratively, if two independent access requests are serviced simultaneously by a DASD storage subsystem or device, then throughput can be doubled over that processed by a single actuator based device. Alternatively, using both actuators to access the same requested data in parallel results in doubling the data rate. The latter is advantageous in responding to requests having long data transfers. Placement of actuators 180 degrees apart reduces average latency from ½ revolution to ¼ revolution where both actuators are dispatched to a requested location and the first over the target sector completes the request.

SUMMARY OF THE INVENTION

It is accordingly an object of this invention to devise a method and means for processing access requests queued against a storage subsystem where the subsystem is formed from dual actuator DASDs.

It is a related object to devise an adaptive method and means where the storage subsystem exhibits a lower relative response (access) time over a significant range of referencing rates than any of the current operating modes irrespective of whether the mix of requested records is predominantly short or long.

The foregoing objects are satisfied by a method and means in which commands are queued against a dual actuator DASD storage subsystem. In processing each of the commands, the method steps comprise ascertaining the command queue length, availability of each of the DASD's dual actuators, and whether the record being accessed exceeds a threshold length (T). Next, if the queue is two or more or if the queue is one and one actuator is unavailable, then a single actuator is dispatched as it becomes available. The actuator is bound for record transfer at the location referenced in the command. Alternatively, where the queue is one and both actuators are available, then two actuators are dispatched. In this latter case, the first actuator to arrive over the DASD record location is bound for record transfer where the record length is less than (<) a threshold length T, otherwise, both actuators are bound for same record transfer.

More particularly, the dispatching steps include either (1) causing the idling (idle mode) of the actuators in the absence of a queue;

(2) causing each actuator to independently service a different request (independent mode), the queue being at least of length two, or, the queue being of length one and both actuators being not free;

(3) dispatching both actuators and causing the first actuator to arrive at the referenced location to service the request (latency reduction mode), the queue being of length one, both actuators being free, and the record being accessed being of length less than T; or (4) dispatching both actuators and causing each actuator to concurrently service the same request (parallel transfer mode), the queue being of length one, both actuators being free, and the record being accessed being of length greater than T.

Advantageously, the method and means of this invention adaptively respond such that as the queue of requests change, the storage subsystem response changes in a balanced manner without system intervention. Also, only one version of dual actuator DASD need be used.

DESCRIPTION OF THE PREFERRED EMBODIMENT

Logical Organization of Dual Actuator DASD

Figure 1:
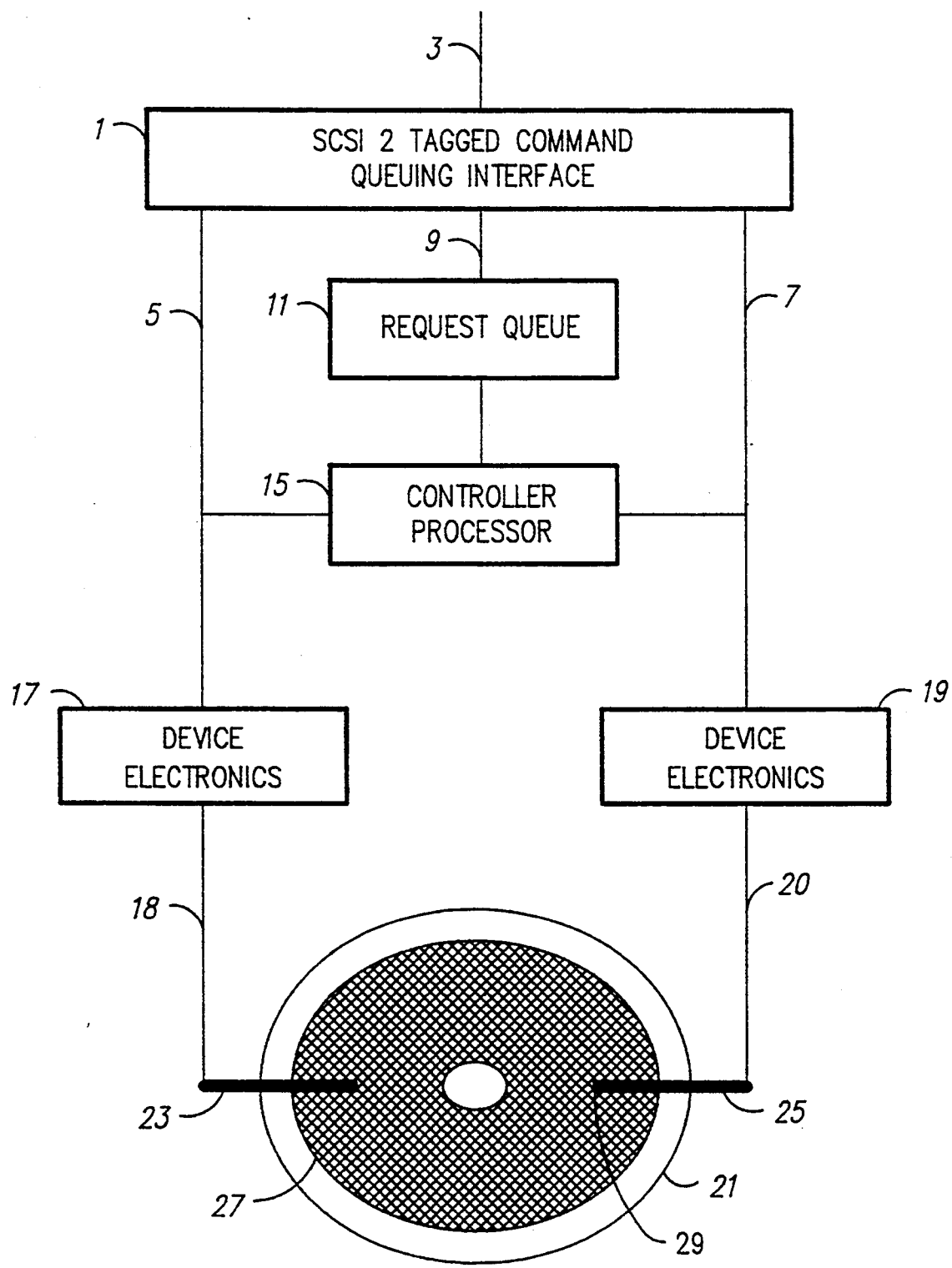
FIG. 1 shows a dual actuator DASD and queue and path controls according to the invention.

Referring now to FIG. 1, there is shown a logic diagram of a dual actuator DASD. Commands and data to and from at least one processor (not shown), termed a host, are applied to the storage subsystem over path 3 to interface 1. This interface is preferably of the small computer standard SCSI-2 Queued Command Tagged Interface type. The SCSI-2 interface transfers data between a processor host and a DASD either synchronously or asynchronously. An asynchronous data transfer means that the receiving device acknowledges receipt for each byte before the next can be sent. Synchronous data transfer allows blocks of data to be sent at a predetermined rate without receiving an acknowledgment for each byte. The standard SCSI-2 interface includes a bus, a set of commands for controlling the bus, and a protocol for arbitrating conflicting bus use.

SCSI-2 uses a tagged command system which permits higher data transfer by permitting a host to send out multiple requests and allowing the designated DASD controller to determine the order in which to execute the requests. That is, each command received by interface 1 from a host is applied over path 9 and applied to request queue 11. This feature enables the host to send out several commands without waiting for acknowledgment because they will be queued for later execution. Commands can be tagged as either ordered or unordered. Ordered commands are processed by controller processor 15 on a first-in-first-out basis while unordered commands are sorted by priority and executed in a sequence that achieves fastest throughput.

The commands or I/O requests queued in request queue 11 are incomplete requests. That is, action on the part of the DASD subsystem needs to be invoked. Each command is taken up in turn for processing. Upon completion, each command is removed from the request queue 11 and new ones are added as received.

Typically, requests may be expressed as a series of read and write commands decoded by controller processor 15. Relatedly, the cyclic multitracked disk storage 21 is accessed by a pair of actuators 23 and 25 disposed over the disk surface and spaced apart by a 180 degree angle. The controller processor 15 applies an address argument to either actuator 23 or 25 or both through counterpart device electronics 17 and 19. This causes each addressed actuator to move radially either in or out in a linear (straight line) over the surface of disk 21. Now, each actuator 23 and 25 is transducer tipped at one their respective ends by read/write heads 27 and 29. Concurrent with movement of the actuators toward one or more target tracks, disk 21 rotates at a constant speed so that the target record location (sector or cell) on any given track can be intercepted within less than a rotation once at least one of the read/write heads is positioned. At this point, a signal path is established from at least one transducer say 27 over an electrical conductor 18, device electronics 17, path element 5, and interface 1 to a host coupled to path 3. A similar path connection may be established from transducer 29 over conductor 20, device electronics 19, path element 7, and interface 1.

Significantly, the method and means of this invention are operable with dual actuator DASDs of the type in which both actuators share a common input/output (I/O) request queue and they are spaced 180 degrees apart to provide for latency reduction.

Latency Reduction and the Angle of Actuator Separation

Let A be the angle of separation in degrees between two actuators. Let L be the average latency in a fraction of a revolution and R be the time for one DASD track revolution.

In determination of the average latency, consideration is given to the fact of latency within the included angle A between the actuators and 360-A.

The average L for angle $A = (A/360)*(R/2)$
The average L for angle $(360-A) = ((360-A)/360)*(R/2)$
The overall average $L = (A/360)*((A/360)*(R/2) + ((360-A)/360)*((360-A)/360)*(R/2)$
This reduces to $L = (R/(2*360^2))*(2A^2 - 720A + 360^2)$
Minimum latency occurs where $$dL/dA = (\frac{1}{2}*360*360)*(4A-720) = 0$$

QED A = 180 degrees

Logical Flow of the Adaptive Method

Figure 2:
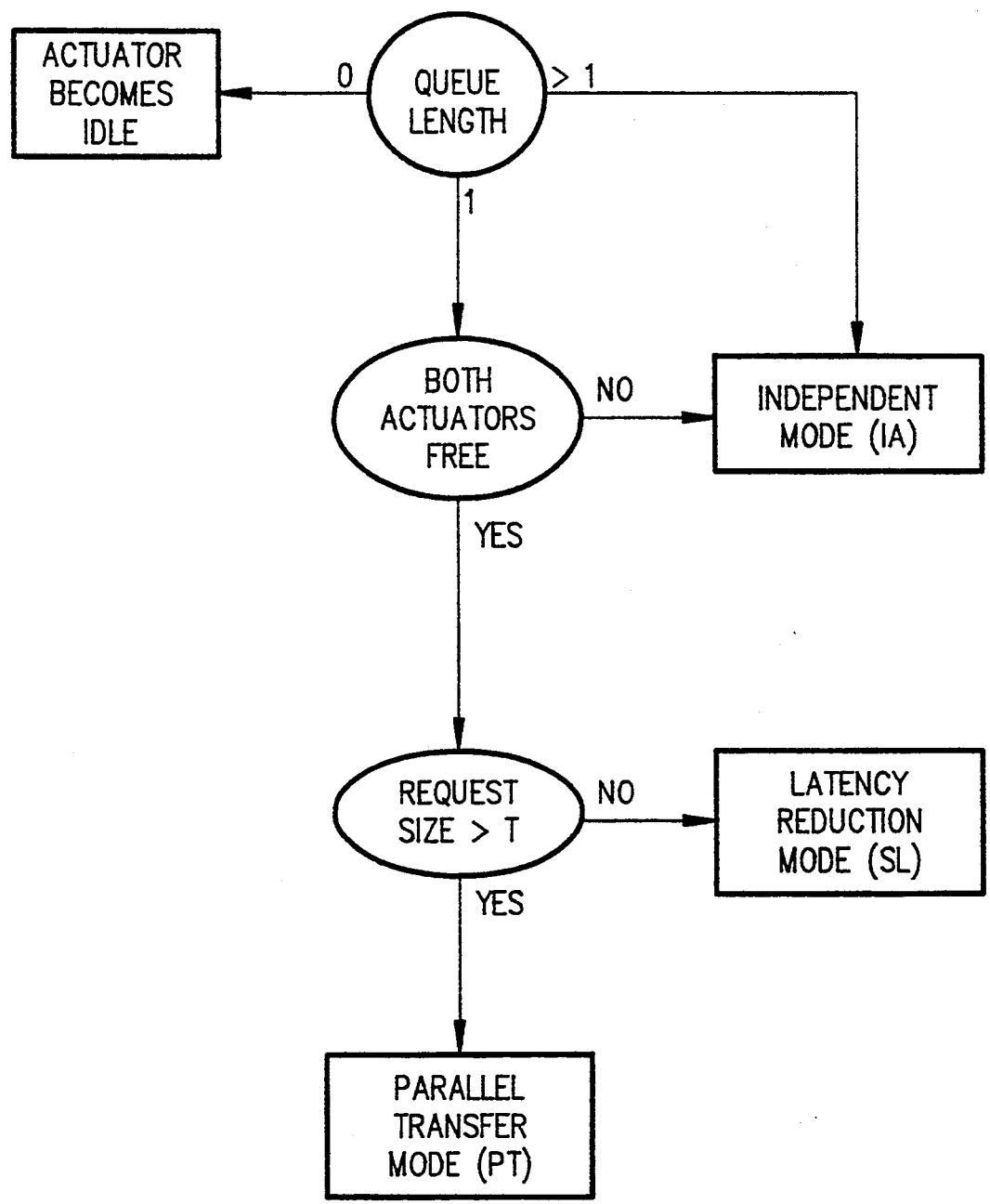
FIG. 2 sets forth a flow chart of the method of the invention.

Referring now to FIG. 2, there is depicted a flow chart of the inventive method for operating a dual actuator DASD, the method automatically adapting to changes in the operating environment. This method is invoked each time controller processor 15 needs to decide how it should service the next I/O request from request queue 11. This happens either when an actuator has just completed an I/O and is now available to service another I/O, or an I/O request has just arrived from the host and at least one actuator is idle.

Broadly, the method steps include
(1) examining the number the number of I/O requests in the shared request queue 11.
(2) If there is no I/O request outstanding, the actuator 23 or 25 becomes idle.
(3) If there is more than one I/O request in the queue, then the two actuators are operated independently, with each actuator servicing a different request. This would maximize the request throughput. Average latency for each I/O is ½ revolution, but queuing time is shortened.
(4) If there is only one I/O request in the queue, but one of the two actuators is currently busy, then use the non-busy actuator independently to service the request. Average latency for this I/O is ½ revolution, but it can be started without having to wait for the busy actuator to become free.
(5) If there is only one I/O request in the queue, and both actuators are not busy, then examine the block length of the request.
(6) Let T be some threshold length. T must be at least half a track long.
(7) If the request length is less than T, then operate the drive in the latency reduction mode. Send both actuators to access (read or write) the data, allowing the first actuator to arrive at the target sector to complete the I/O request. The slower actuator will not proceed any further and becomes free. The average latency of this I/O is ¼ revolution.
(8) If the request length is greater than or equal to T, then operate the drive in the parallel transfer mode. There are several different ways to using the two actuators in this mode, one of which is described here.

To illustrate step (8) above: Let there be 2S blocks on each track, and let the I/O request starts at block X. Send both actuators to access either block X or block X+S. One actuator, say Actuator 23, will arrive at block X first. At about the same time, the other actuator, say 25, will arrive at block X+S. On the average, this happens after ¼ revolution, so the average latency is ¼ revolution. Both actuators will transfer data to/from their respective blocks. After ½ revolution, all the data on that track has been accessed, half a track by each actuator. The two actuators can then switch to the next track and continue their parallel access. This is repeated until the I/O request is completed. Thus, the data rate is doubled.

EXAMPLES

The following two examples will assume that a dual actuator DASD such as shown in FIG. 1 has an average seek time of 10 milliseconds, a period of disk rotation of 12 milliseconds, dual actuators spaced apart by 180 degrees as in FIG. 1, and a transfer time of 1 millisecond per block of data.

The examples are intended to compare the response time of such a system to different I/O patterns between the three modes mutually exclusively and the inventive adaptive method.

Example 1

| I/O REQUEST | NUMBER OF BLOCKS | TIME OF ARRIVAL IN MSEC | INDEPENDENT ARMS IN MSEC | SHORTEST LATENCY IN MSEC | PARALLEL TRANSFER IN MSEC | ADAPTIVE METHOD IN MSEC |
|---|---|---|---|---|---|---|
| X1 | 1 | 0 | 17 | 14 | 16.5 | 14 |
| X2 | 1 | 12 | 17 | 16 | 21 | 18 |
| X3 | 1 | 18 | 17 | 24 | 31.5 | 17 |
| X4 | 20 | 40 | 36 | 35 | 35.5 | 26 |
| | | TOTALS | 87 | 89 | 104.5 | 75 |

Figure 3:
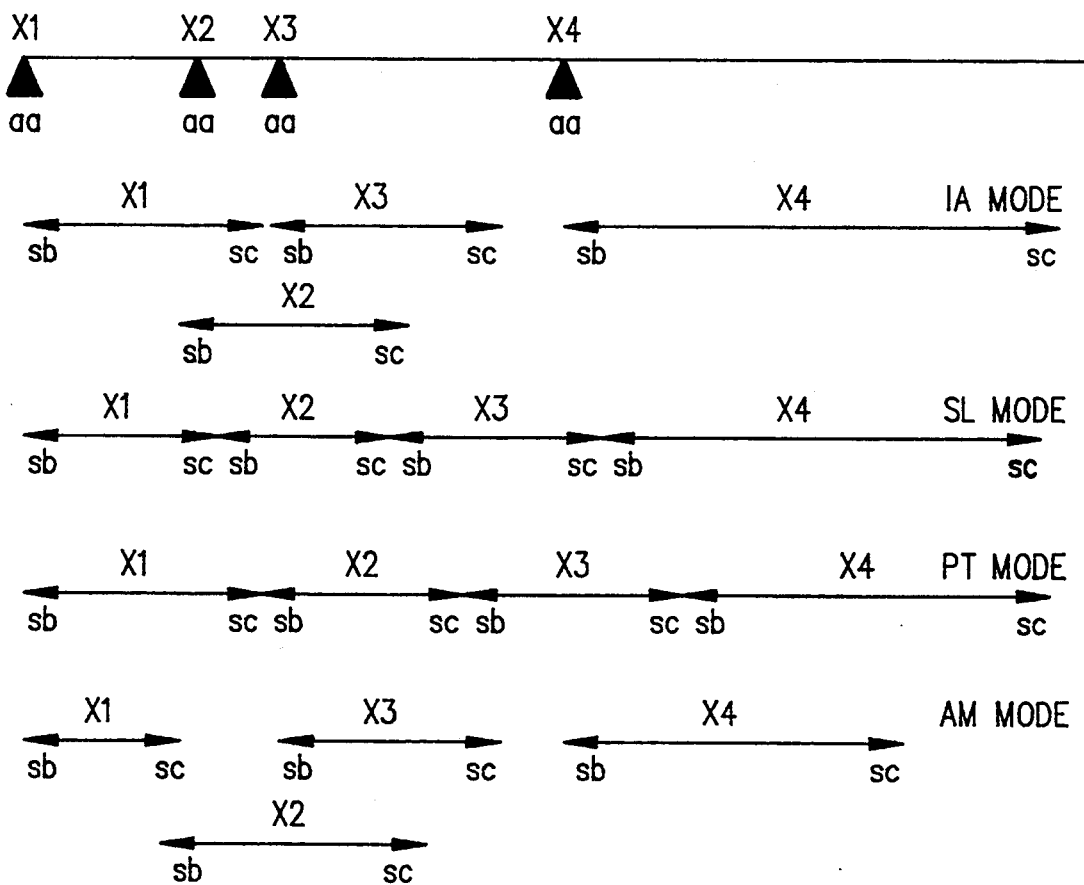
FIG. 3 depicts a timing diagram of a comparative example between selected operating modes and the inventive method and means.

Referring now to the table of example 1 and FIG. 3, there is assumed a queue of four access commands X1-X4 whose times of arrival are measured relative to the arrival time of X1. To illustrate the sensitivity to record length X1-X3 reference records of 1 block length while X4 references a record of 20 blocks in length. Note, the comparison is insensitive as to whether the references are either read or write type.

It is desired to evaluate the response time associated with each of four modes, namely, independent actuation (IA), shortest latency (SL), parallel transfer (PT), and the adaptive method (AM).

IA Mode

In the case of processing X1-X4 in the IA mode, starting with command X1 it takes 10 ms for actuator 23 to seek to the track. Also, it requires ½ a disk rotation or 6 ms to access the record under head 27. Lastly, it 1 ms is expended in transferring the 1 block of the referenced record. This totals to 10+6+1=17 ms.

While the actuator 23 is accessing in response to X1, the second actuator 25 is available for accessing a record required by X2 since X2's arrival overlaps X1's processing. By the same reasoning 17 ms is the elapsed time for resolving X2. X3's arrival occurs just after X1 has been completed but prior to the completion of X2. Thus, the first actuator 23 becomes available for processing X3.

Per the example assumptions, X3 requires 17 ms of time. Lastly, either one of the actuators are available for accessing the record specified by X4. In this case, the total time includes 10 ms seek time+6 ms latency+20 ms block transfer time=36 ms. The total access time for processing X1-X4 is 3*17+36=87 ms SL Mode In this mode the actuators are ganged for purposes of the seek but the head of the actuator that is nearest the record is the one obtaining access. In this example, in process X1 it would take 10 ms to seek to the track. However, the maximum latency is ½ of 12 ms or 6 ms. However with two ganged actuators the average latency would be reduced to ½ of 6 ms or 3 ms. This means that the X1 access time would consist of 10 ms seek time+3 ms of latency+1 ms of block transfer for a total of 14 ms. That is X1 is completed at t=14 ms.

Even though X2 has arrived at t=12 ms, neither actuator becomes available until after X1 processing has completed. This means that the elapsed time for processing X2 includes the 2 ms difference between X2 time of arrival and X1 processing completion. The total time for processing X2 includes 2 ms waiting+10 ms access+3 ms latency+1 ms block transfer=16 ms.

In this scenario, command X3 has arrived at t=18 ms. The elapsed time for its processing must include the 10 ms difference between X3 arrival time and the completion of processing of X2. The latter occurs at t=28 ms. The total time for X3 includes the 10 ms wait+10 ms access+3 ms latency+1 ms block transfer=24 ms. X3 has completed at t=42 ms.

Lastly, X4 has arrived at t=40 ms. This require a 2 ms wait until X3 has been finished. The total time for X4 includes a 2 ms wait+10 ms access+3 ms latency+20 ms block transfer=35 ms.

The total access time for X1-X4=14+16+24+35=89 ms

PT Mode

In the parallel transfer mode, the two actuators are operated as if they were one logical actuator with two heads. Thus, for X1 it takes 10 ms seek time+6 ms latency+0.5 ms block transfer=16.5 ms elapsed time. The 0.5 ms block transfer is occasioned by the fact that both heads are passing the data in parallel. X2 arriving at t=12 ms must endure a 4.5 ms wait (16.5 ms−2 ms) until X1 processing is completed. The X2 processing by the same reasoning includes the 4.5 ms wait+10 ms seek+6 ms latency+0.5 block transfer=21 ms. X2 completes at t=33 ms.

Since X3 arrives at t=18 ms, it must wait 33 ms−18 ms=15 ms. X3 processing time includes the 15 ms wait+6 ms latency+0.5 block transfer=31.5 ms. X3 completes at t=49.5 ms. Finally, X4 arriving at t=40 must wait 9.5 ms until X3 completes. X4 processing time includes 9.5 ms wait+10 ms seek+6 ms latency+10 ms block transfer=35.5 ms.

The total time for processing X1-X4 in the parallel transfer mode=16.5+21+31.5+35.5=104.5 ms. Clearly, the PT mode is not efficient for any but long block transfers.

Adaptive Method Mode

Referring to FIGS. 2 and 3, the method of the invention can be applied to processing commands X1-X4 of Example 1. When X1 is received at time t=0 ms, the queue length is equal to 1 and both actuators are free. Also, since a record of only 1 block<T is being requested, then the SL mode should be used. In SL both actuators are ganged together for the seek and the head of the actuator closest to the record on the track passes the block. The time to process X1=10 ms seek+3 ms latency+1 ms block transfer=14 ms.

X2 arrives at t=12 ms. At that time both actuators are involved in the SL mode processing X1. Note, X2 must wait for 1 ms since at time T=13 ms one of the two actuators involved in the SL mode becomes available while the other one is bound to X1's 1 block transfer. Referring again to FIG. 2, the queue length=1 and both actuators are NOT free. This means that the processing of X2 involves the IA mode. X2 processing time in the IA mode=1 ms wait+10 ms seek+6 ms latency+1 ms block transfer=18 ms. X2 completes processing at t=12+18=30 ms.

X3 arriving at t=18 ms finds that both actuators are not free so that it will be processed in the IA mode. Since X2 is being processed in the IA mode, then the other actuator is available without waiting. The total time includes 10 ms seek+6 ms latency+1 ms block transfer=17 ms. X3 completes at t=18+17=35 ms.

X4 arriving at t=40 ms finds both actuators free and the requested block size exceeds threshold T such that it will be processed in the PT mode. The X4 processing time includes a 10 ms seek+6 ms latency+10 ms block transfer=26 ms.

The processing time for X1-X4 is 14+18+17+26=75 ms.

Example 2

| I/O REQUEST | NUMBER OF BLOCKS | TIME OF ARRIVAL IN MSEC | INDEPENDENT ARMS IN MSEC | SHORTEST LATENCY IN MSEC | PARALLEL TRANSFER IN MSEC | ADAPTIVE METHOD IN MSEC |
|---|---|---|---|---|---|---|
| X1 | 16 | 0 | 32 | 29 | 29 | 24 |
| X2 | 4 | 22 | 20 | 24 | 20 | 19 |
| X3 | 16 | 34 | 32 | 41 | 32 | 35 |
| X4 | 4 | 50 | 20 | 42 | 34 | 20 |
| | | TOTALS | 104 | 136 | 110 | 98 |

Example 2 is directed to demonstrating that the adaptive method yields a lower response (access) time than that of any of the operating modes even where the mix of long and short record transfers significantly changes. In view of the detailed discussion in connection with Example 1, the comparison should follow the exemplary same reasoning set forth.

Extensions

One extension to the method and means of this invention is to utilize both actuators in performing roll mode access, i.e., do data access to the first sector that each actuator encounters after arriving on track. Data transfer would occur out of sequence, making the operation more complicated. However, latency would be further reduced.

Figure 4:
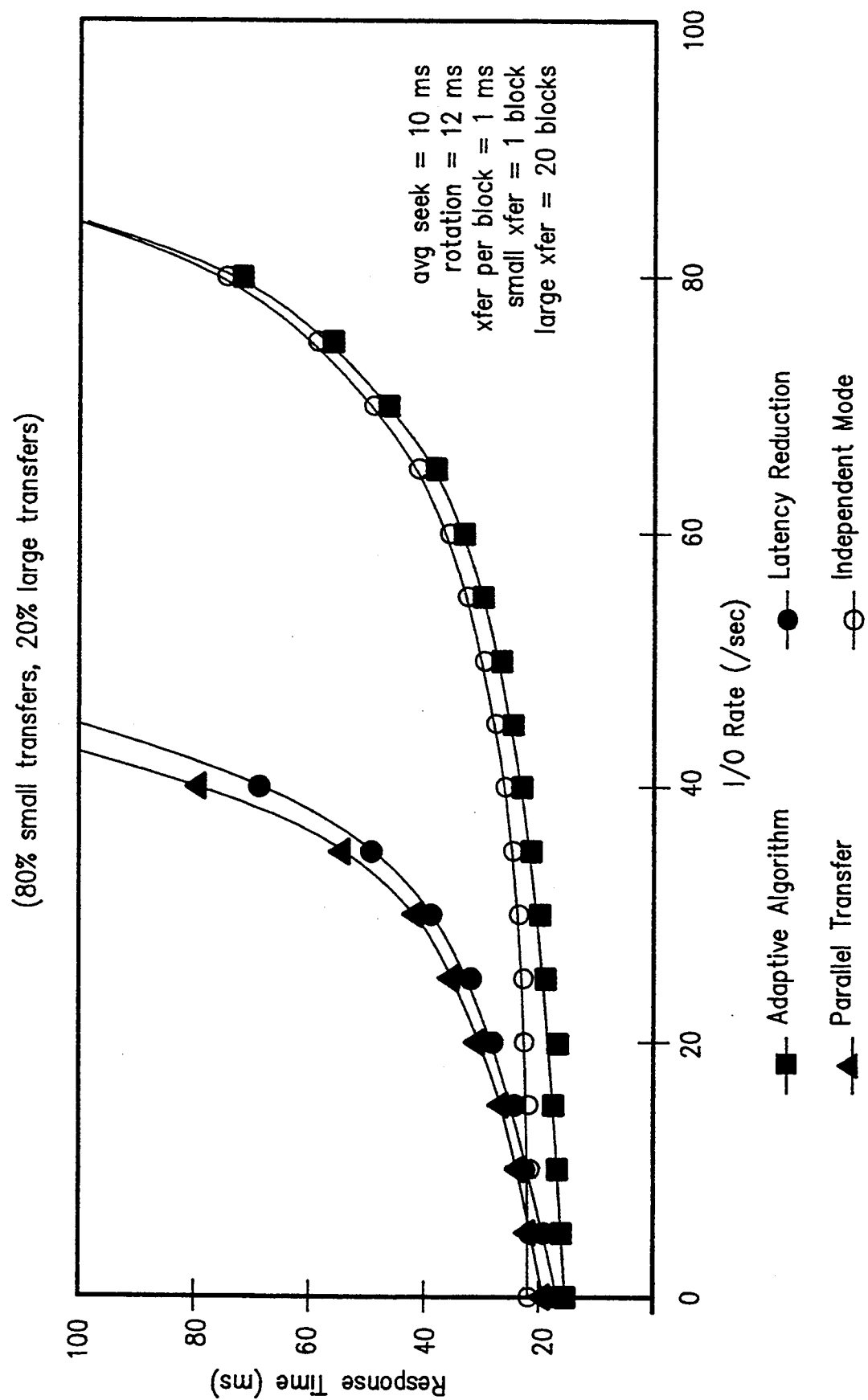
FIG. 4 illustrates response time versus I/O rate for a mix of 80% small transfers and 20% large transfers for a queuing model comparison of the three operating modes and the adaptive method.
Figure 5:
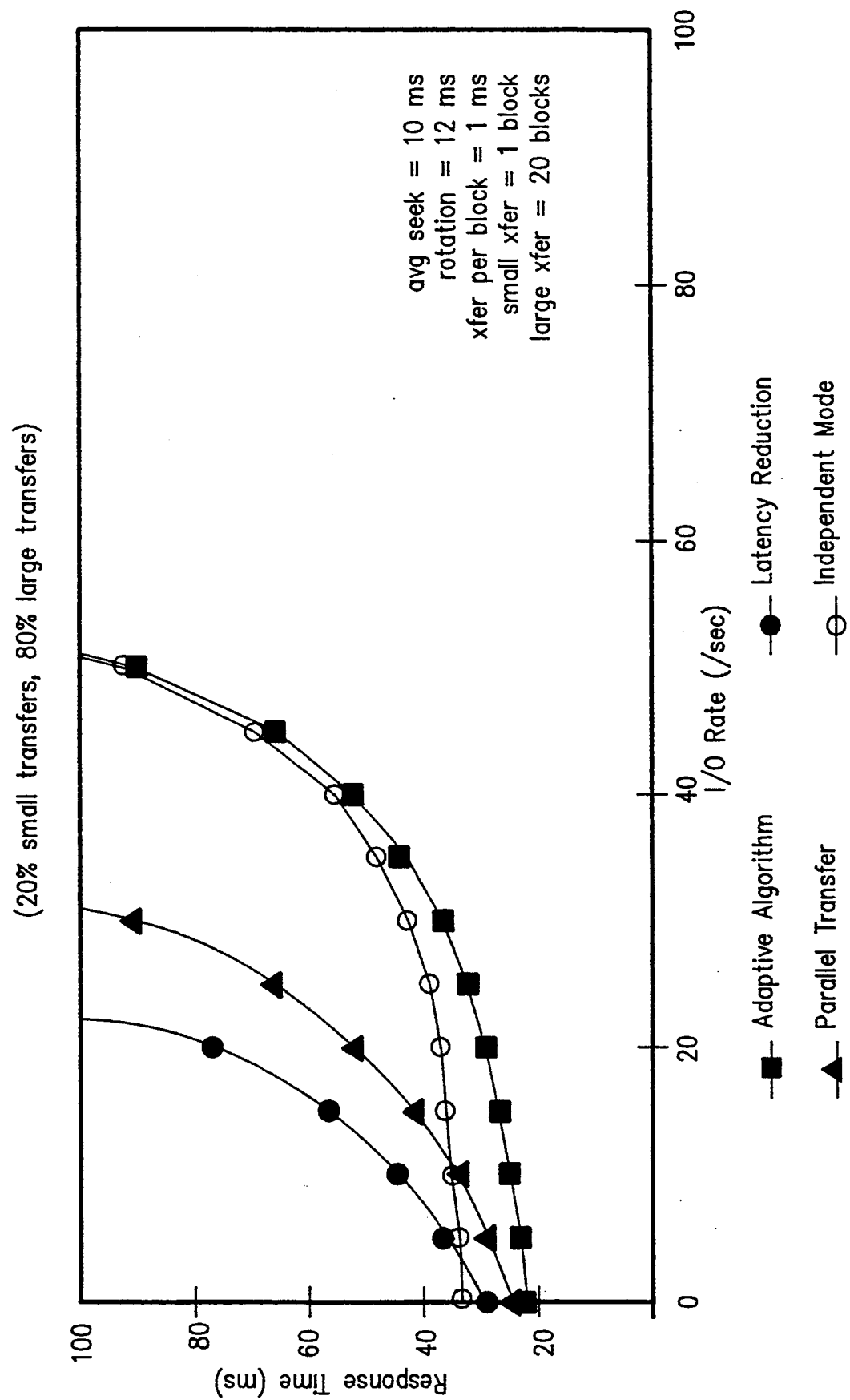
FIG. 5 shows response time versus I/O rate for a mix of 20% small transfers and 80% large transfers for a queuing model comparison of the three operating modes and the adaptive method.

Referring now to FIGS. 4 and 5, there are depicted graphs of the average response time in milliseconds for each of the three operating modes and the adaptive method as a function of the I/O reference rate (read or write commands per second). These graphs express the operating modes and adaptive method performance using a queuing system model. That is, a system in which a queue of elements awaiting service is formed and a service process by one or more servers is exercised on the queue elements according to some discipline.

It should be noted in Examples 1 and 2 that the inter arrival time between references X1-X4 varies. Indeed, since the supply of references is independent, the inter arrival time between references is assumed to be an independent random variable distributed in an exponential (Poisson) manner. The service time is also assumed to be a random variable. It is measured form the time an actuator becomes available until a request bound to that actuator is completed (data transferred). That is service time=seek time+latency+block transfer time+overhead time. Overhead time includes the time taken to interpret a command or to ascertain status of an event or condition. It does not include waiting time. Also, the model for the three modes and the adaptive method assumes that the queue length of requests is infinite.

Reference is made to any standard work on queuing theory or operations research such as Hillier and Lieberman, "Introduction to Operations Research", chapter 16, pp. 595–655, copyright 1967, 1990 by McGraw Hill Publishing Co., New York, for an exposition on the mathematical study of queues or waiting lines.

The latency reduction (SL) and parallel transfer modes (PT) may be characterized in queuing notation as following an M/M/1 model while the independent actuator (IA) and a portion of the adaptive method follow an M/M/2 model. This means that the SL and PT modes are characterized by a Markov or exponential distribution of inter arrival times of reference commands, an exponential distribution of service times processing the references, and a single server in the form of a single logical actuator. The IA mode and a portion of adaptive method assume probabilistically that both actuators are free.

The graphs in FIGS. 4 and 5 were generated by following a description of the modes as used in Examples 1 and 2 and applying probabilistic expressions relating throughput to the based on M/M/1 and M/M/2 queuing models (see Hillier et al at pages 611–618) to inter arrival rate of references.

The relationships characterizing the graphs are:
Let:
T=average DASD service time
LR=average I/O rtequest arrival rate
S=average seek time
R=time for 1 DASD disk rotation
D=DASD disk data rate
B=length of an I/O requested record For the SL (Latency Reduction) Mode $T = S + R/4 + B/D$ For the PT (Parallel Transfer) Mode $T = S + R/2 + B/2D$ For the IA (Independent Actuaction) Mode $T = S + R/2 + B/D$ M/M/1 Equations:

$H = LR * T$

Response time $= T/(1-H)$

M/M/2 Equations:

$H = LR * T/2$

Response time $= T + (T*H^2)/(1-H^2)$

Referring again to FIG. 4, the adaptive method for a transfer load of 80% small transfers (of 1 block each) and 20% of large transfers (of 20 blocks each) is clearly advantageous over the three operating modes in the sense of low response times for low I/O rates in the range from 0 to 75 references/sec. Above that range there is a convergence only between the adaptive method and that of the IA mode. Where the transfers change to a mix of 20% small transfers and 80% large transfers, advantage remains in favor of the adaptive mode for I/O rates between 0 and 55 references/sec. Above that range there is a convergence only between the adaptive and IA modes.

Restated, the occupancy of the actuators selectively dispatched in the reference rate limit is no less than the occupancy of actuators independently scheduled for record transfers whose record length exceeds a predetermined threshold.

These and other extensions of the invention may be made without departing from the spirit and scope thereof as recited in the appended claims.

I claim:

1. A method for ensuring maximal occupancy of dual, independently dispatchable, actuators movable over a cyclic multitracked DASD in transferring any mix of short and long records responsive to a set of queued externally received commands referencing said records, the inter-arrival time between the commands being a random variable exponentially distributed, said inter-arrival time having a predetermined lower bound, comprising in the processing of each command the steps of:

(a) ascertaining actuator availability, reference queue length, and the length of the referenced record; and (b) dispatching selectively ones of the actuators to the record referenced by the command being processed and solely as a function of actuator availability, reference queue length, and the length of the referenced record such that the occupancy of the actuators selectively dispatched where the inter-arrival time approaches the lower bound is no less than the occupancy of actuators independently scheduled for record transfers whose record length exceeds a predetermined threshold.

2. The method according to claim 1, wherein step (b) further comprises the steps of:

(b1) dispatching a single actuator as it becomes available and binding it for record transfer at the location referenced in the command where either the queue of commands exceeds more than one command in length, or, the queue of commands is exactly one command in length and one of the actuators has already been dispatched; and (b2) dispatching two actuators where the queue of commands is exactly one command in length and both actuators are available, and, binding the first actuator for record transfer to arrive over the DASD record location referenced in the command where the record length is less than a threshold T, otherwise, binding both actuators for same record transfer.

3. A method for ensuring maximal occupancy of dual, independently dispatchable, actuators movable over a cyclic multitracked DASD in transferring a mix of short and long records responsive to a set of queued commands referencing said records, comprising in the processing of each command the steps of:

(a) ascertaining actuator availability, reference queue length, and the length of the referenced record; and (b) either dispatching a single actuator as it becomes available and binding said single actuator for record transfer at the location referenced in the command where either the queue of commands exceeds more than one command in length, or, the queue of commands is exactly one command in length and one of the actuators has already been dispatched, or dispatching two actuators where the queue of commands is exactly one command in length and both actuators are available, and, binding the first actuator for record transfer to arrive over the DASD record location referenced in the command where the record length is less than a predetermined threshold T, otherwise binding both actuators for the same record transfer.

4. In a cyclic multi-tracked DASD storage subsystem having a queued command tagged interface, a pair of transducer tipped actuators movably mounted to access records located on the DASD, and means responsive to each extrinsic command received across said interface for selectively positioning the actuators over the DASD track location and for transferring any record referenced by the command across said interface through a path including at least one transducer, a method for minimizing the access time over a set of variable length records, comprising in processing each command the steps of:

(a) ascertaining actuator availability, command queue length, and whether the record being accessed exceeds a threshold length (T);

(b) dispatching a single actuator on an availability basis where either the queue includes at least two commands or where the queue includes a single command and both actuators are not concurrently available; and (c) otherwise dispatching two actuators on an availability basis, binding only that one of the actuators having its transducer first positioned over the referenced record where said record exhibits a length<T, and binding both actuators where said record length>T.

5. The method according to claim 4, wherein said commands are received sequentially such that any inter arrival time is an exponentially distributed independent random variable, and further wherein time to access a record starts when an available actuator is dispatched and terminates upon any referenced record being transferred between the interface and the DASD, said access time being an exponentially distributed independent random variable, wherein the method invokes at any one time one of three modes namely, independently dispatching and binding of actuators, dispatching a pair of actuators and binding the first to locate the record referenced in the command being processed, and dispatching a pair of actuators and binding both of them to the same record referenced in the command being processed.

6. The method according to claim 5, wherein the method operatively selects and interleaves the modes such that the average response time in the reference rate limit is no more than that of the mode wherein the actuators are independently dispatched and bound.

7. The method according to claim 4, wherein T is at least one half of a track in length, and further wherein said actuators are spaced 180 degrees apart.

8. In a cyclic multi-tracked DASD storage subsystem having an interface, a pair of transducer tipped actuators movably mounted to access records located on said DASD, and means responsive to each extrinsic command for selectively positioning the actuators to any DASD location referenced by said command and transferring any referenced record between the DASD and the interface over a path including at least one transducer, said commands being received sequentially to form a queue such that any inter arrival time constituting an exponentially distributed independent random variable, time to access a record starting when an available actuator is dispatched and terminating upon any referenced record being transferred between the interface and the DASD, said access time also constituting an exponentially distributed independent random variable, a method for minimizing access time in the processing of each command comprising the steps of:

(a) dispatching a single actuator on an availability basis if at the time of command execution either the queue includes at least two commands or where the queue includes a single command and both actuators are not concurrently available; and (b) otherwise dispatching two actuators on an availability basis, binding only that one of the actuators having its transducer first positioned over the referenced record where said record exhibits a length<a threshold T, and binding both actuators where said record length>T.

9. In a storage subsystem having an interface for passing records and commands, a cyclic multi-tracked storage medium for storing said records, a pair of transducer tipped actuators movably mounted in respect of said medium, means for enqueuing the commands, said commands referencing records at designated track locations, and means for processing each command in turn by causing one or more available actuators to seek the track containing a referenced record, to resolve any rotational latency, and to transfer the referenced record upon resolution between its track location and the interface over a path including at least one transducer, a method for ensuring maximal occupancy of dual actuators in transferring any percentage mix of short and long records comprising in the processing of each command the steps of:

(a) ascertaining the reference queue length, actuator availability, and whether the record being accessed exceeds a threshold length (T); and (b) executing one step selected from the set of steps consisting of:

(1) causing the idling of the actuators in the absence of a queue;

(2) causing each actuator to independently service a different request where either the queue of commands is at least two commands in length, or, where the queue of commands is exactly one command in length, and both actuators being not free;

(3) dispatching both actuators and causing the first actuator to arrive at the referenced location to service the request, where the queue of commands is exactly one command in length, both actuators are free, and the record being accessed is of length less than T; or (4) dispatching both actuators and causing each actuator to concurrently service the same request where the queue of commands is exactly one command in length, both actuators are free, and the record being accessed is of length greater than T.

10. In a cyclic multi-tracked DASD storage subsystem having a queued command tagged interface; a pair of transducer tipped actuators movably mounted to access records located on the DASD, and means responsive to each extrinsic command received across said interface for selectively positioning the actuators over the DASD track location and for transferring any record referenced by the command across said interface through a path including at least one transducer, wherein said positioning and transferring means further comprise:

(a) means for ascertaining the queue length of commands, actuator availability, and whether the record being accessed exceeds a threshold length (T);

(b) means for dispatching a single actuator on an availability basis where either the queue includes at least two commands or where the queue includes a single command and both actuators are not concurrently available; and (c) means otherwise for dispatching two actuators on an availability basis, binding only that one of the actuators for record transfer having its transducer first positioned over the referenced record where said record exhibits a length $<T$, and binding both actuators for transferring the same record where said record length $>T$.

* * * * *

UNITED STATES PATENT AND TRADEMARK OFFICE
CERTIFICATE OF CORRECTION

PATENT NO. : 5,341,351
DATED : Aug. 23, 1994
INVENTOR(S) : Spencer W. Ng.

It is certified that error appears in the above-indentified patent and that said Letters Patent is hereby corrected as shown below:

Column 8, line 8, after "wait +" add --10 ms seek +--

Signed and Sealed this

Fourth Day of July, 1995

Attest:

BRUCE LEHMAN

*Attesting Officer*  *Commissioner of Patents and Trademarks*